US008346720B2

(12) United States Patent
Nagasawa et al.

(10) Patent No.: US 8,346,720 B2
(45) Date of Patent: Jan. 1, 2013

(54) INFORMATION UPDATE SYSTEM, INFORMATION UPDATE METHOD, AND COMPUTER-READABLE MEDIUM

(75) Inventors: Yoshihiro Nagasawa, Tokyo (JP); Keigo Murakami, Tokyo (JP)

(73) Assignee: NEC Corporation, Tokyo (JP)

( * ) Notice: Subject to any disclaimer, the term of this patent is extended or adjusted under 35 U.S.C. 154(b) by 427 days.

(21) Appl. No.: 12/051,728

(22) Filed: Mar. 19, 2008

(65) Prior Publication Data

US 2008/0235290 A1 Sep. 25, 2008

(30) Foreign Application Priority Data

Mar. 22, 2007 (JP) ................................. 2007-075592

(51) Int. Cl.
*G06F 7/00* (2006.01)
*G06F 17/00* (2006.01)
(52) U.S. Cl. .................... 707/610; 707/640; 707/661
(58) Field of Classification Search .................. None
See application file for complete search history.

(56) References Cited

U.S. PATENT DOCUMENTS

| | | | | |
|---|---|---|---|---|
| 6,766,248 B2* | 7/2004 | Miyahara | ...................... | 701/532 |
| 6,981,061 B1* | 12/2005 | Sakakura | ...................... | 709/248 |
| 7,111,019 B1* | 9/2006 | Nishizawa et al. | ................... | 1/1 |
| 7,278,068 B1* | 10/2007 | Crowder, Jr. | ................... | 714/100 |
| 7,366,460 B2* | 4/2008 | O'Farrell et al. | ............ | 455/3.06 |
| 7,444,337 B2* | 10/2008 | Zhou et al. | ............... | 1/1 |
| 7,467,116 B2* | 12/2008 | Wang | .............................. | 706/20 |
| 7,620,948 B1* | 11/2009 | Rowe et al. | ................... | 717/171 |
| 8,131,670 B2* | 3/2012 | i Dalfo et al. | ................. | 707/610 |
| 2002/0046285 A1* | 4/2002 | Yasushi et al. | ................. | 709/228 |
| 2002/0169776 A1* | 11/2002 | Tuunanen et al. | ................. | 707/9 |
| 2002/0178220 A1* | 11/2002 | Smith et al. | .................... | 709/203 |
| 2003/0192060 A1* | 10/2003 | Levy | ............................. | 725/133 |
| 2004/0048597 A1* | 3/2004 | Khushu et al. | ............ | 455/404.2 |
| 2004/0053607 A1* | 3/2004 | Ronneke | .................... | 455/422.1 |
| 2005/0015471 A1* | 1/2005 | Zhang et al. | ..................... | 709/221 |
| 2005/0128935 A1* | 6/2005 | Tang et al. | .................... | 370/208 |
| 2005/0157712 A1* | 7/2005 | Rangarajan et al. | ......... | 370/388 |
| 2005/0203962 A1* | 9/2005 | Zhou et al. | .................... | 707/200 |
| 2006/0066503 A1* | 3/2006 | Sampsell et al. | ............... | 345/1.1 |
| 2006/0069780 A1* | 3/2006 | Batni et al. | ..................... | 709/226 |
| 2006/0106806 A1* | 5/2006 | Sperling et al. | ................ | 707/10 |
| 2006/0130064 A1* | 6/2006 | Srivastava | ..................... | 718/102 |
| 2006/0206504 A1* | 9/2006 | Cai et al. | ...................... | 707/100 |
| 2006/0212530 A1* | 9/2006 | O'Farrell et al. | ............ | 709/212 |

(Continued)

FOREIGN PATENT DOCUMENTS

JP 2002116940 A 4/2002

(Continued)

OTHER PUBLICATIONS

Japanese Office Action for JP2007-075592 mailed on May 29, 2012.

*Primary Examiner* — Usmaan Saeed (57) ABSTRACT

A system includes a first server apparatus storing information and a plurality of second server apparatuses being connected to the first server apparatus. Each of the plurality of second server apparatuses transmits an update request signal for request to update the information stored in the first server apparatus to the first server apparatus. The first server apparatus selects, when receiving the update request signal, an update scheme corresponding to the update request signal out of a plurality of update schemes. The first server apparatus updates information corresponding to the update request signal with the selected update scheme.

6 Claims, 8 Drawing Sheets

U.S. PATENT DOCUMENTS

| | | |
|---|---|---|
| 2006/0212543 A1* | 9/2006 | O'Farrell et al. ............. 709/219 |
| 2006/0212846 A1* | 9/2006 | O'Farrell et al. ............. 717/116 |
| 2006/0268835 A1* | 11/2006 | Hyotylainen et al. ........ 370/352 |
| 2007/0060124 A1* | 3/2007 | Kalavade ..................... 455/433 |
| 2007/0112943 A1* | 5/2007 | Fisher et al. ................. 709/220 |
| 2007/0263798 A1* | 11/2007 | Dewing et al. ............ 379/88.13 |
| 2008/0013533 A1* | 1/2008 | Bogineni et al. ............. 370/389 |
| 2008/0052400 A1* | 2/2008 | Ekberg .......................... 709/227 |
| 2008/0235290 A1* | 9/2008 | Nagasawa et al. ........... 707/200 |
| 2009/0267953 A1* | 10/2009 | Sampsell et al. ............. 345/520 |
| 2010/0054618 A1* | 3/2010 | Kawazoe et al. ............ 382/239 |

FOREIGN PATENT DOCUMENTS

| | | |
|---|---|---|
| JP | 2002229833 A | 8/2002 |
| JP | 2002288028 A | 10/2002 |
| JP | 2002351726 A | 12/2002 |
| JP | 2005515712 A1 | 5/2005 |

* cited by examiner

| TERMINAL IDENTIFICATION INFORMATION | SUBSCRIBER NAME | PHONE NUMBER | IP ADDRESS | SIP SERVER | SERVICE USE INFORMATION ||| |
|---|---|---|---|---|---|---|---|
| | | | | | AS1 | AS2 | AS3 |
| abcde | ○○ | 060********  | 172.16.xx.xx | SERVER A | PLAN A | SERVICE 1 | ON |
| fghij | ×× | 060******** | 172.19.xx.xx | SERVER B | — | SERVICE 2 | OFF |
| klmno | △△ | 090******** | 172.31.xx.xx | SERVER A | PLAN C | — | OFF |
| ... | | | | | | | |

| APPLICATION SERVER | UPDATE METHOD |
|---|---|
| AS1 | FIRST WIN |
| AS2 | FIRST WIN |
| AS3 | LAST WIN |
| AS4 | FIRST WIN |

INFORMATION UPDATE SYSTEM, INFORMATION UPDATE METHOD, AND COMPUTER-READABLE MEDIUM

This application is based upon and claims the benefit of priority from Japanese patent application No. 2007-075592, filed on Mar. 22, 2007, the disclosure of which is incorporated herein in its entirety by reference.

BACKGROUND OF THE INVENTION

1. Field of the Invention

The present invention relates to a technique for updating information in a database connected to a network.

2. Description of the Background Art

In recent years, there has been a trend to implement all communication networks using IP (Internet Protocol). An IMS (IP Multimedia Subsystem) has been proposed that implements integrated multimedia services by implementing, using IP, all services that have been provided so far by a fixed network, mobile communication, broadcasting, etc.

For the IMS, there is a technique described in Japanese Patent Application National Publication (Laid-Open) No. 2005-515712, for example. Japanese Patent Application National Publication (Laid-Open) No. 2005-515712 discloses a method and a system for changing a contract in an IMS such that appropriate services can be guaranteed even after a profile of a subscriber has been changed.

Meanwhile, as a scheme for updating information on a subscriber in an IMS, there is a so-called first win scheme. When a system updates information with the first win scheme, the system uses an identification number to which "1" is added every time data is updated.

An apparatus which requests for an update to a database periodically acquires an identification number from the database. The apparatus transmits the identification number together with an update request to the database. When the database receives the update request, the database compares the received identification number with a current identification number which is held thereby. Then, only when both identification numbers match, the database updates data and adds "1" to the current identification number. By this sequence, the identification number is updated.

Thus, after that, even when a data update request with an identification number, which was obtained prior to the above-mentioned update, are transmitted to the database from another apparatus, the identification number does not match the identification number of the database. In this case, a data update requested by the another apparatus is rejected and thus an update is not performed.

SUMMARY OF THE INVENTION

In an update using the above described first win scheme, since a data update is accepted only once for one identification number, data integrity of a database is maintained. However, an apparatus that requests for an update needs to periodically acquire the latest identification number from the database, and thus, it is difficult to reduce load on a network.

On the other hand, there is a so-called last win scheme in which data is updated without the database side checking an identification number. When the last win scheme is employed, load on a network is reduced; however, it is difficult to maintain integrity depending on the type of information which is an update target.

The present invention is made in view of the above-described problems and an object of the present invention is to provide a technique for appropriately updating information in a database.

An information update system according to the present invention comprises: a first server apparatus storing information; and a plurality of second server apparatuses being connected to the first server apparatus, wherein each of the plurality of second server apparatuses comprises means for transmitting an update request signal for request to update the information stored in the first server apparatus to the first server apparatus, and the first server apparatus comprises means for selecting, when receiving the update request signal, an update scheme corresponding to said update request signal out of a plurality of update schemes and updating information corresponding to the update request signal with the selected update scheme.

A computer-readable medium, according to the present invention, carrying a program that causes a computer storing information functions of selecting, when receiving an update request signal for request to update the stored information, an update scheme corresponding to said update request signal out of a plurality of update schemes, and updating information corresponding to the update request signal with the selected update scheme.

An information update method according to the present invention is for a system including a first server apparatus that stores information and a plurality of second server apparatuses connected to the first server apparatus, the method comprising: transmitting an update request signal, from the plurality of second server apparatuses to the first server apparatus, for request to update the information stored in the first server apparatus; selecting, when the first server apparatus receives the update request signal, an update scheme corresponding to said update request signal out of a plurality of update schemes; and updating information corresponding to the update request signal with the selected update scheme.

According to the present invention, information can be appropriately updated.

DESCRIPTION OF THE PREFERRED EMBODIMENTS

Figure 1:
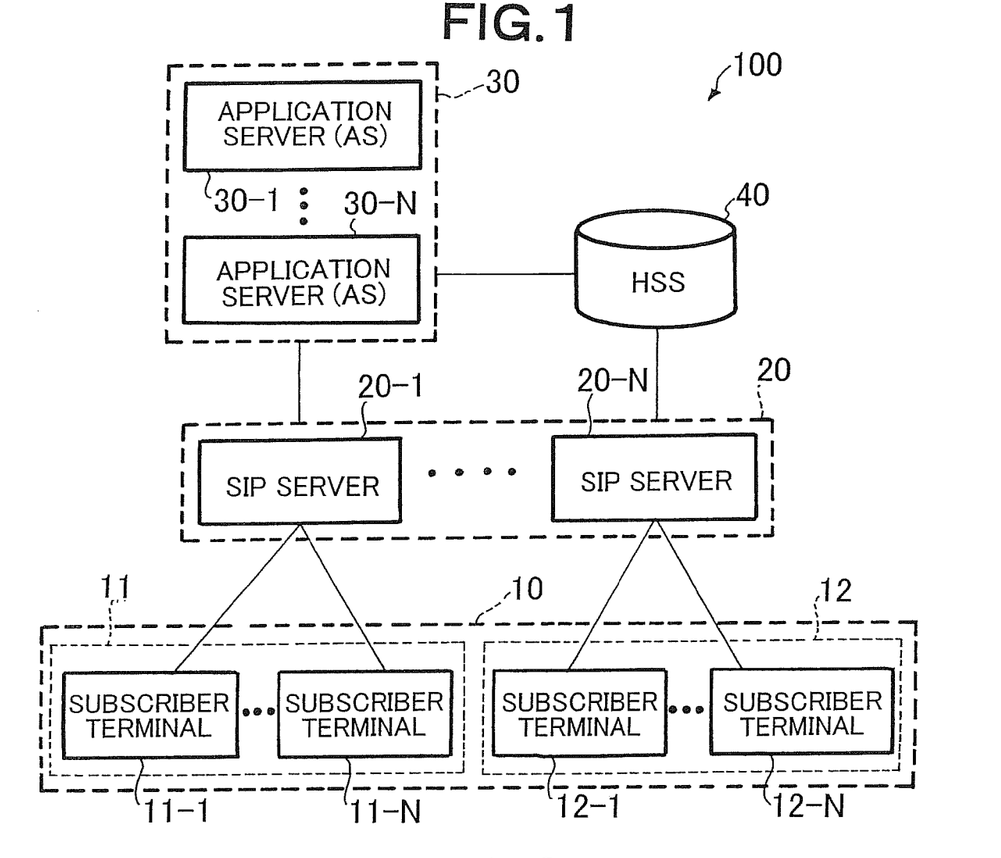
FIG. 1 is a block diagram of an information update system in an embodiment of the present invention.

An information update system 100 (including an information storage server, an information update method, and a program) according to an embodiment of the present invention will be described below. FIG. 1 is a block diagram showing the overall configuration of the information update system 100.

As shown in FIG. 1, the information update system 100 includes subscriber terminals 11-1 to 11-N and subscriber terminals 12-1 to 12-N (hereinafter, collectively referred to as a "subscriber terminal group 10"); SIP (Session Initiation Protocol) servers 20-1 to 20-N (hereinafter, collectively referred to as a "SIP server group 20"); ASs (Application Servers) 30-1 to 30-N (hereinafter, collectively referred to as an "AS group 30"); and an HSS (Home Subscriber Server) 40.

In the above-described configuration, the HSS 40 corresponds to a first server apparatus in the present invention. The ASs 30-1 to 30-N correspond to a plurality of second server apparatuses.

The subscriber terminals 11-1 to 11-N in the subscriber terminal group 10 form a subscriber network 11. Also, the subscriber terminals 12-1 to 12-N in the subscriber terminal group 10 form a subscriber network 12. Any of the SIP servers in the SIP server group 20 is assigned to each of the subscriber networks in the subscriber terminal group 10. The subscriber terminals in the subscriber terminal group 10 each are a communication device such as a portable terminal, a fixed line phone, or a predetermined information processing apparatus. The subscriber terminals in the subscriber terminal group 10 can make a voice phone call (IP phone call) to each other through the SIP servers in the SIP server group 20.

In addition, the subscriber terminal group 10 can use services to be provided by the AS group 30, through the SIP server group 20. In order for the subscriber terminal group 10 to use services to be provided by the AS group 30, there is a need to make registration for use of the services to be respectively provided by the ASs 30-1 to 30-N. Registration for use can be made from the subscriber terminal group 10, for example. A choice of the services to be provided by the AS group 30 can be arbitrarily changed by users (subscribers).

The SIP server group 20 controls, by a SIP, the establishment and opening of communication paths to be used between the subscriber terminals in the subscriber terminal group 10, between the AS group 30 and the subscriber terminal group 10, and between the HSS 40 and the subscriber terminal group 10. The subscriber terminals in the subscriber terminal group 10 are respectively associated with specific SIP servers (20-1 to 20-N). The subscriber terminal group 10 basically communicates with the AS group 30 or the HSS 40 through the specific SIP servers (20-1 to 20-N), except roaming.

The AS group 30 provides a service in response to a service request from the subscriber terminal group 10. Examples of services include a message service, a chat service, and a presence service. The ASs in the AS group 30 may provide services of the same type or may provide different services.

The HSS 40 is a server that stores subscriber information (46), which will be described later, about the subscriber terminal group 10. The subscriber information (46) includes service use information indicating the registration status of the respective subscriber terminals 11-1 to 11-N and 12-1 to 12-N for services to be provided by the AS group 30. The service use information is updated by an update request signal from the respective ASs 30-1 to 30-N. An update request is transmitted when, for example, a registration status has been changed. Note that in the present embodiment the information update system 100 includes a single HSS 40 but may include a plurality of HSSs 40.

Figure 2:
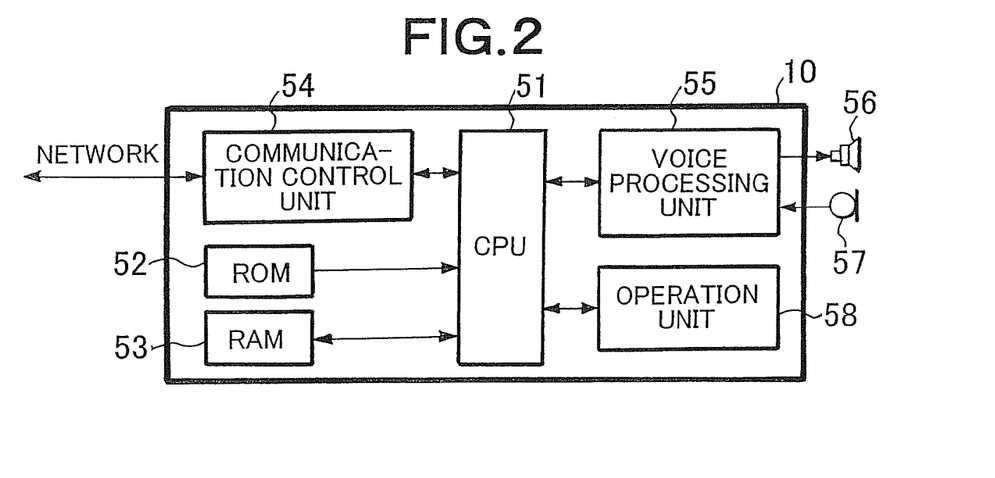
FIG. 2 is a block diagram showing an exemplary configuration of a subscriber terminal in the embodiment of the present invention.

FIG. 2 is a block diagram showing an exemplary configuration of each subscriber terminal in the subscriber terminal group 10. As shown in FIG. 2, the subscriber terminals in the subscriber terminal group 10 each include a CPU (Central Processing Unit) 51, a ROM (Read Only Memory) 52, a RAM (Random Access Memory) 53, a communication control unit 54, a voice processing unit 55, a speaker 56, a microphone 57, and an operation unit 58.

The CPU 51 controls the overall operation of the terminal. The ROM 52 stores a program for controlling the operation of the CPU 51. The RAM 53 is composed of a volatile memory and functions as a work area for the CPU 51. The communication control unit 54 is an interface for connecting to the SIP server group 20 through a network.

The voice processing unit 55 collects sound such as user's voice sound by the microphone 57, converts the sound into a voice signal by an A/D converter included in the voice processing unit 55, and inputs the voice signal to the communication control unit 54. Also, the voice processing unit 55 outputs a phone call sound demodulated by a D/A converter included in the voice processing unit 55 to the speaker 56.

The operation unit 58 accepts an operation from a user and inputs an operation signal to the CPU 51. The operation unit 58 is operated by the user when he/she makes a phone call or uses various services.

Figure 3:
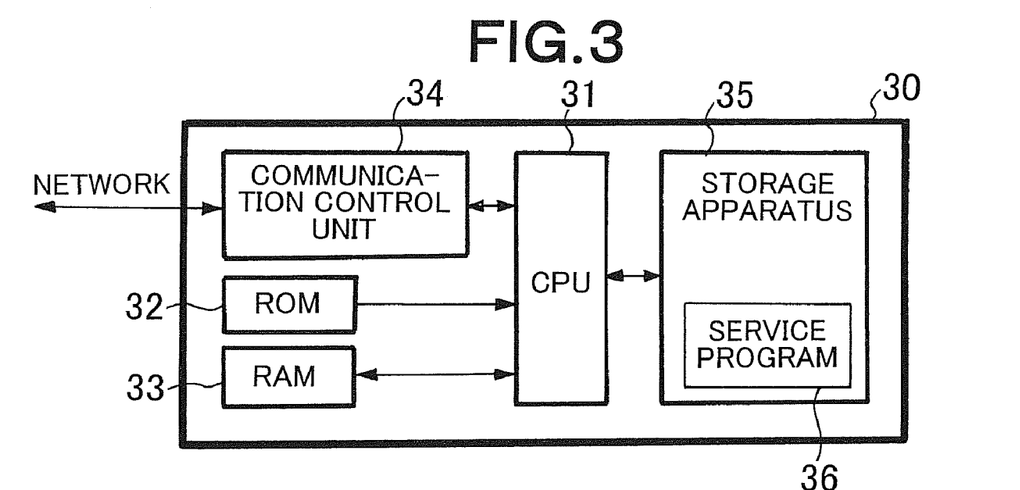
FIG. 3 is a block diagram showing an exemplary configuration of an application server (AS) in the embodiment of the present invention.

FIG. 3 is a block diagram showing an exemplary configuration of each AS in the AS group 30. As shown in FIG. 3, the ASs in the AS group 30 each include a CPU 31, a ROM 32, a RAM 33, a communication control unit 34, and a storage apparatus 35.

The CPU 31 controls the overall operation of the server. The ROM 32 stores a program for controlling the operation of the CPU 31. The RAM 33 is composed of a volatile memory and functions as a work area for the CPU 31. The communication control unit 34 is an interface for connecting to the SIP server group 20 or the HSS 40 through a network.

The storage apparatus 35 is a nonvolatile data saving area and stores various data. In the storage apparatus 35, a service program 36 is stored. The service program 36 is a program for providing a service to the subscriber terminal group 10. By the CPU 31 executing the service program 36, a service such as the above-described chat service is provided to the subscriber terminal group 10. Note that the service program 36 may be stored in the ROM 32.

Figure 4:
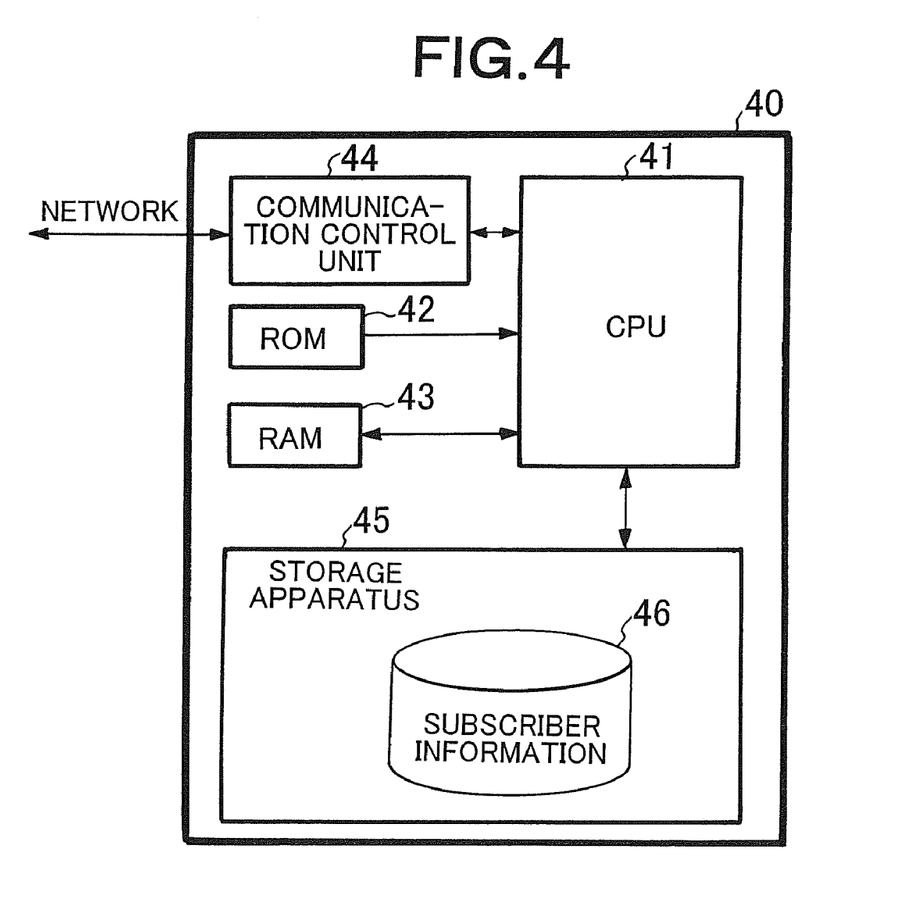
FIG. 4 is a block diagram showing an exemplary configuration of an HSS in the embodiment of the present invention.

FIG. 4 is a block diagram showing an exemplary configuration of the HSS 40. As shown in FIG. 4, the HSS 40 includes a CPU 41, a ROM 42, a RAM 43, a communication control unit 44, and a storage apparatus 45.

The CPU 41 controls the overall operation of the HSS 40. The ROM 42 stores a program for controlling the operation of the CPU 41. Also, the ROM 42 stores a program for performing an information update process which will be described later. The RAM 43 is composed of a volatile memory and functions as a work area for the CPU 41. The communication control unit 44 is an interface for connecting to the SIP server group 20 or the AS group 30 through a network.

Figure 5:
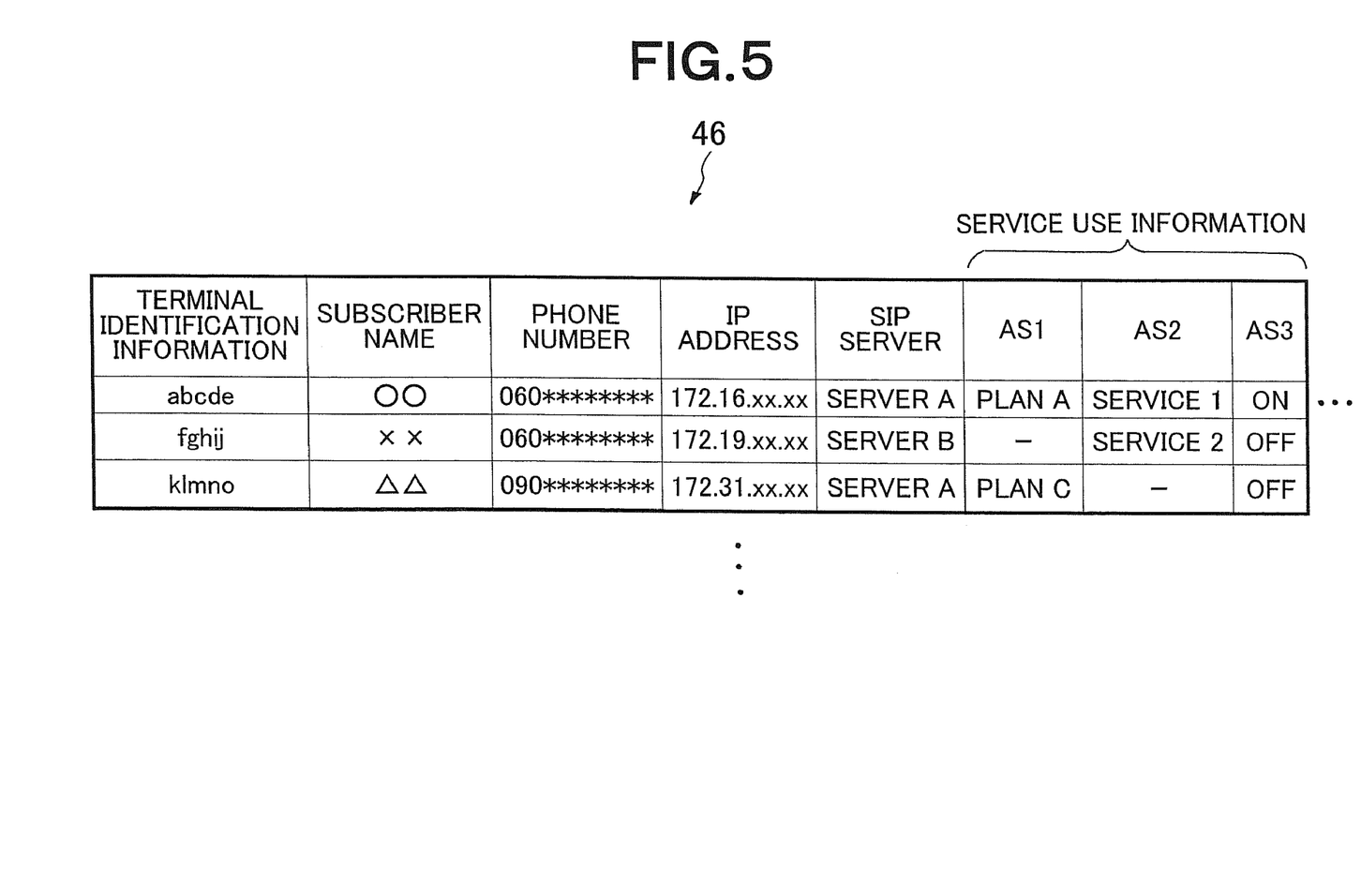
FIG. 5 is a diagram showing an exemplary configuration of subscriber information in the embodiment of the present invention.

The storage apparatus 45 is a nonvolatile data saving area and stores various data. In the storage apparatus 45, subscriber information 46 about the subscriber terminal group 10 is stored. The subscriber information 46 is, as shown in FIG. 5, data including, for example, terminal identification information, a subscriber name, an IP address, a SIP server to which a subscriber terminal belongs, and service use information represented by "AS1" to "AS3" in the drawing, which are associated with one another.

The "service use information" is use information, registration information, or the like, on services to be provided by the AS group 30. The "service use information" is registered for each of the subscriber terminals in the subscriber terminal group 10. The "terminal identification information" is updated when a subscriber has changed the registration content of a service provided by the AS group 30. The update is performed by the HSS 40 receiving an update request signal that includes a target of change and the content of change for service use information, from a target AS. The content of an update request signal is a change in the update content of a certain "service use information" for a certain "terminal identification information".

Specifically, the HSS 40 receives an update request signal which indicates, for instance, that a service use state as to "AS3" at the terminal "abcde" (FIG. 5) has been changed from "off" to "of". The CPU 41 of the HSS 40 updates corresponding subscriber information 46 based on the update request signal.

Figure 6:
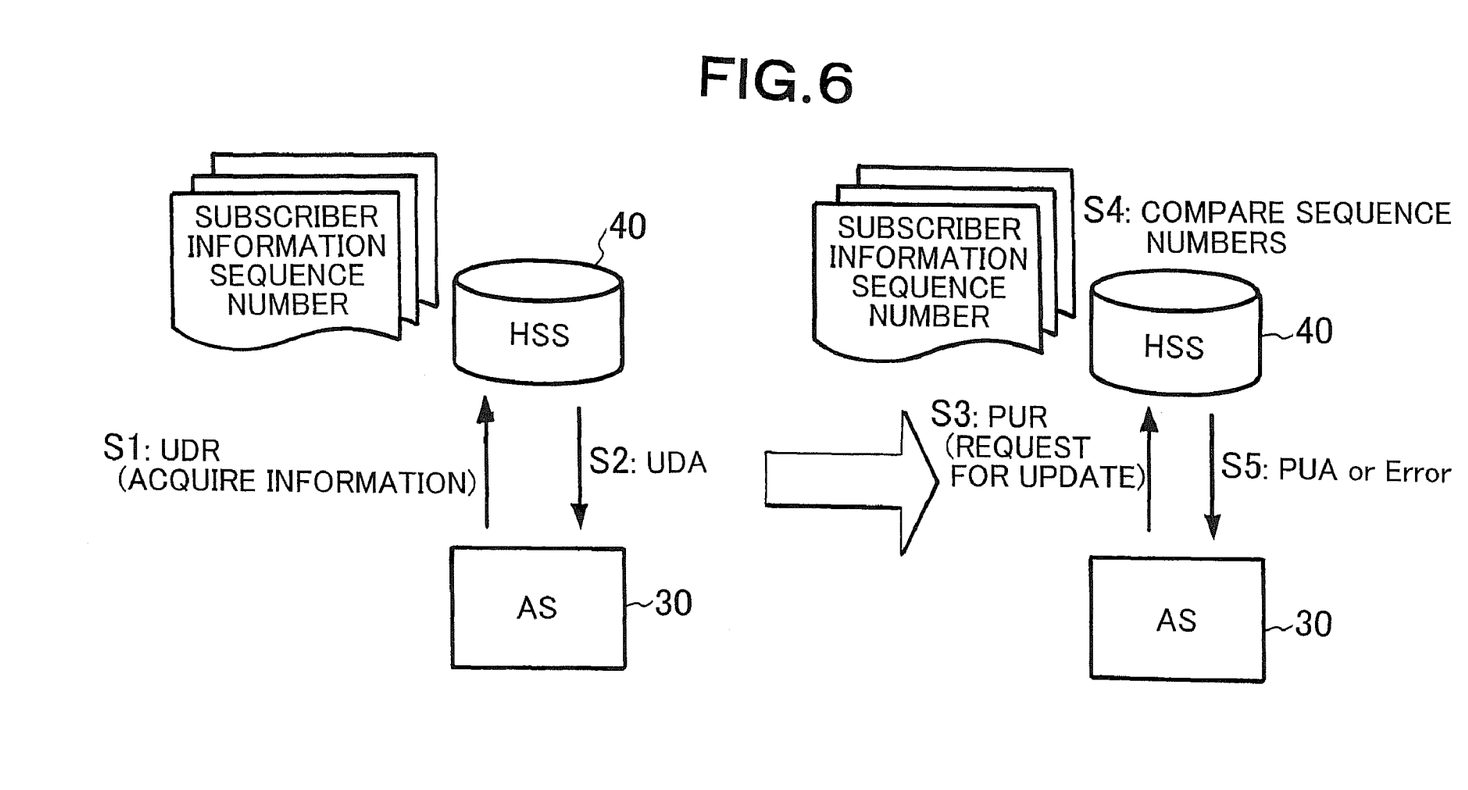
FIG. 6 is an illustrative diagram for an update to subscriber information using a first win scheme.

With reference to FIG. 6, an example will be described in which the subscriber information (46) held by the HSS 40 is always updated using a first win scheme. Note that in the following description, "AS30" indicates any of the ASs 30-1 to 30-N in the AS group 30.

An AS 30 periodically transmits an information acquisition signal (UDR) to the HSS 40 (step S1). The HSS 40 having received the information acquisition signal transmits a signal (UDA) in which a sequence number held thereby is described, to the AS 30 (step S2). The AS 30 holds the received sequence number.

When the AS 30 needs to update subscriber information (46), such as that shown in FIG. 5, which is recorded in the HSS 40, the AS 30 transmits an update request signal (PUR) to the HSS 40 (step S3). At this time, the AS 30 adds "1" to the sequence number held thereby and adds the sequence number to the update request signal. The HSS 40 having received the update request signal also adds "1" to the sequence number held thereby.

The HSS 40 compares the sequence number updated by the above-described addition with the sequence number received from the AS 30 (step S4). If, as a result of the comparison, both sequence numbers match, then the HSS 40 updates the subscriber information (46) based on the update request signal from the AS 30 and transmits a response signal indicating the success of the update to the AS 30 (step S5: PUA). On the other hand, if the sequence numbers do not match, then the HSS 40 does not update the subscriber information 46 and transmits a signal indicating update error to the AS 30 (step S5: Error).

Using FIG. 6, an example of update error will be described. When a plurality of update request signals have arrived on the HSS 40 one after another with very little time in between, it is highly possible that sequence numbers added to the respective signals indicate the same latest number. In this case, an update request signal which arrives first matches a sequence number of the HSS 40 (a result of step S4). The HSS 40 updates subscriber information corresponding to the update request signal arrived first and transmits a response signal indicating the success of the update (step S5: PUA).

On the other hand, when comparing with sequence numbers of other update request signals, "1" has already been added to the sequence number of the HSS 40. Therefore a result of the comparison is a mismatch. Thus, for update request signals arrived later than the one arrived first with very little time in between, a signal indicating update error is transmitted to ASs 30 that have transmitted the update request signals (step S5: Error).

According to the above-described first win scheme, when there are update requests from a plurality of ASs 30 with the same sequence number, sequence numbers of those other than the one arrived first do not match a sequence number of the HSS 40, resulting in update error. By this, mismatching of information as a result of responding to all updates requested using the same sequence number is prevented.

Meanwhile, depending on the content of an update request signal (PUR), there may be no problem in updating the subscriber information 46 using a last win scheme. The last win scheme is a scheme in which every time the HSS 40 receives an update request signal, the HSS 40 updates corresponding subscriber information 46 based on the update request signal. Specifically, in the last win scheme, the HSS 40 responds to all update requests without checking a sequence number.

An update request that is suitable for the last win scheme is, for example, a request to update data having only two types of state value (e.g., "on" and "off"). In the case of such data, even when the subscriber information 46 is updated based on all update request signals, data integrity is less likely to be affected.

In the present embodiment, the first win scheme and the last win scheme are adaptively used. Note that the first win scheme corresponds to a first update scheme in the present invention and the last win scheme corresponds to a second update scheme.

Figure 7:
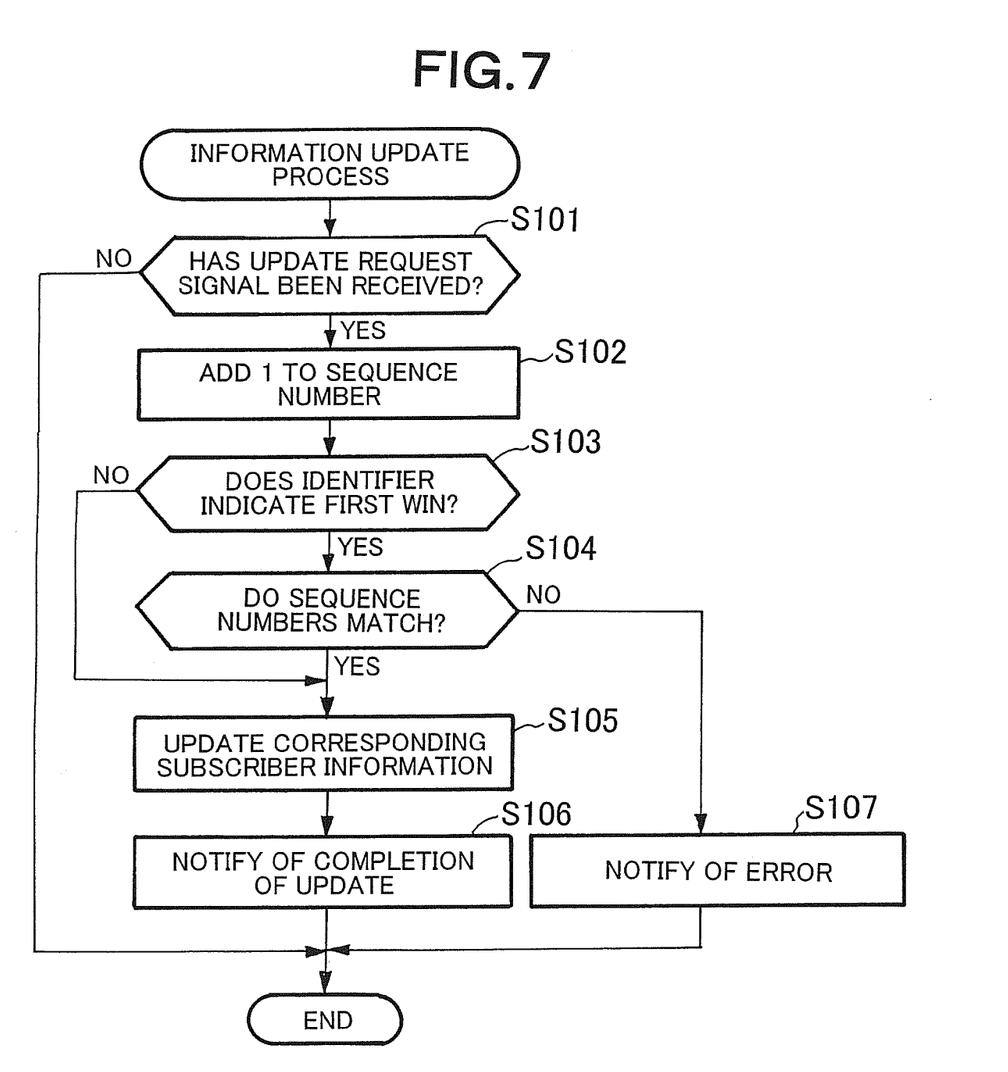
FIG. 7 is a flowchart for describing an operation in the embodiment of the present invention.

The operation of the information update system 100 according to the embodiment of the present invention will be described. FIG. 7 is a flowchart for describing the operation of an information update process to be performed by the CPU 41 of the HSS 40.

When an AS 30 updates subscriber information 46 in the HSS 40, the AS 30 transmits an update request signal according to update content, to the HSS 40. At this time, the AS 30 adds an identifier indicating an update scheme to be applied, i.e., an identifier indicating the first win scheme or the last win scheme, to the update request signal. For example, when information which is an update target has two values such as on and off which are described above, an identifier indicating the last win scheme is added to the update request signal.

The CPU 41 of the HSS 40 performs an information update process by an interrupt process of a predetermined cycle. In the information update process, the CPU 41 determines whether an update request signal has been received from the AS 30. If not ("No" at step S101), then the CPU 41 ends the process there.

On the other hand, if an update request signal has been received ("Yes" at step S101), then the CPU 41 adds "1" to a sequence number stored in the storage apparatus 45 (step S102). In addition, the CPU 41 determines whether an identifier added to the received update request signal indicates the first win scheme (step S103).

If, as a result of the determination, the identifier indicates the first win scheme ("Yes" at step S103), then the CPU 41 determines whether the sequence number stored in the storage apparatus 45 matches a sequence number added to the received update request signal (step S104). If, as a result of the determination, the sequence numbers do not match ("No" at step S104), then the CPU 41 does not update subscriber information 46. The CPU 41 transmits a signal which indicates an update error to the AS 30 having transmitted the update request signal (step S107).

If the sequence numbers match ("Yes" at step S104), then the CPU 41 updates subscriber information 46 based on the received update request signal (step S105) and notifies the AS 30 having transmitted the update request signal of completion of the update (step S106).

On the other hand, if the identifier of the update request signal does not indicate the first win scheme, i.e., if the identifier indicates the last win scheme ("No" at step S103), then the CPU 41 updates subscriber information 46 corresponding to the received update request signal, without checking a match between the sequence numbers (step S105).

As such, the HSS 40 selects an update scheme according to an identifier added to an update request signal from an AS 30. Therefore, an update to the subscriber information 46 can be flexibly performed. In addition, since in the case of the last win scheme there is no need for an AS 30 to periodically acquire a sequence number from the HSS 40, load on communication in the system 100 can be reduced.

An AS 30 provides various services to the subscriber terminal group 10; for example, there is a presence service. The presence service is a service that allows the subscriber terminals in the subscriber terminal group 10 to acquire real-time information about other subscriber terminals.

An AS 30 that provides a presence service registers real-time states of subscriber terminals in subscriber information 46 in the HSS 40. For example, when there are two state values, "present" and "absent", since only the latest state value needs to be obtained, even when the subscriber information 46 is updated using the last win scheme, information integrity is not affected. Accordingly, an update to the subscriber information 46 for such a service does not need to be performed using the first win scheme with a high load of communication and thus the last win scheme is beneficial.

Figure 8:
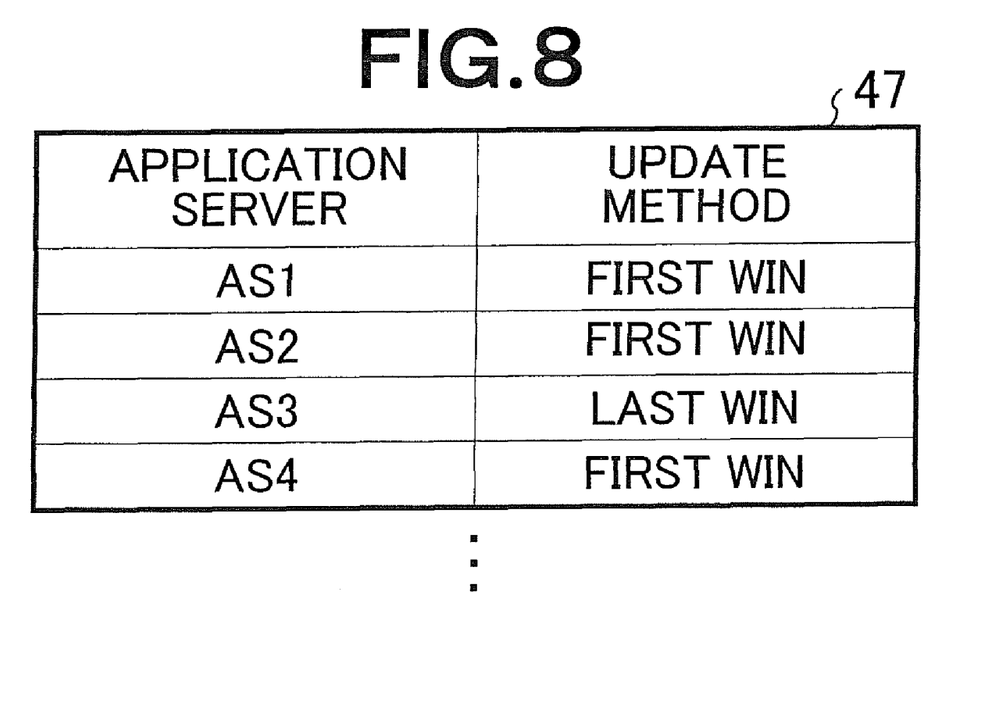
FIG. 8 is an illustrative diagram for a modification of the embodiment of the present invention.

As a modification of the update process described with reference to FIG. 7, the HSS 40 may set in advance an update method (the first win scheme or the last win scheme) for each AS in the AS group 30. In the modification, for example, a table 47, such as that shown in FIG. 8, in which the ASs in the AS group 30 are associated with their respective update methods may be set in the storage apparatus 45 of the HSS 40.

Figure 9:
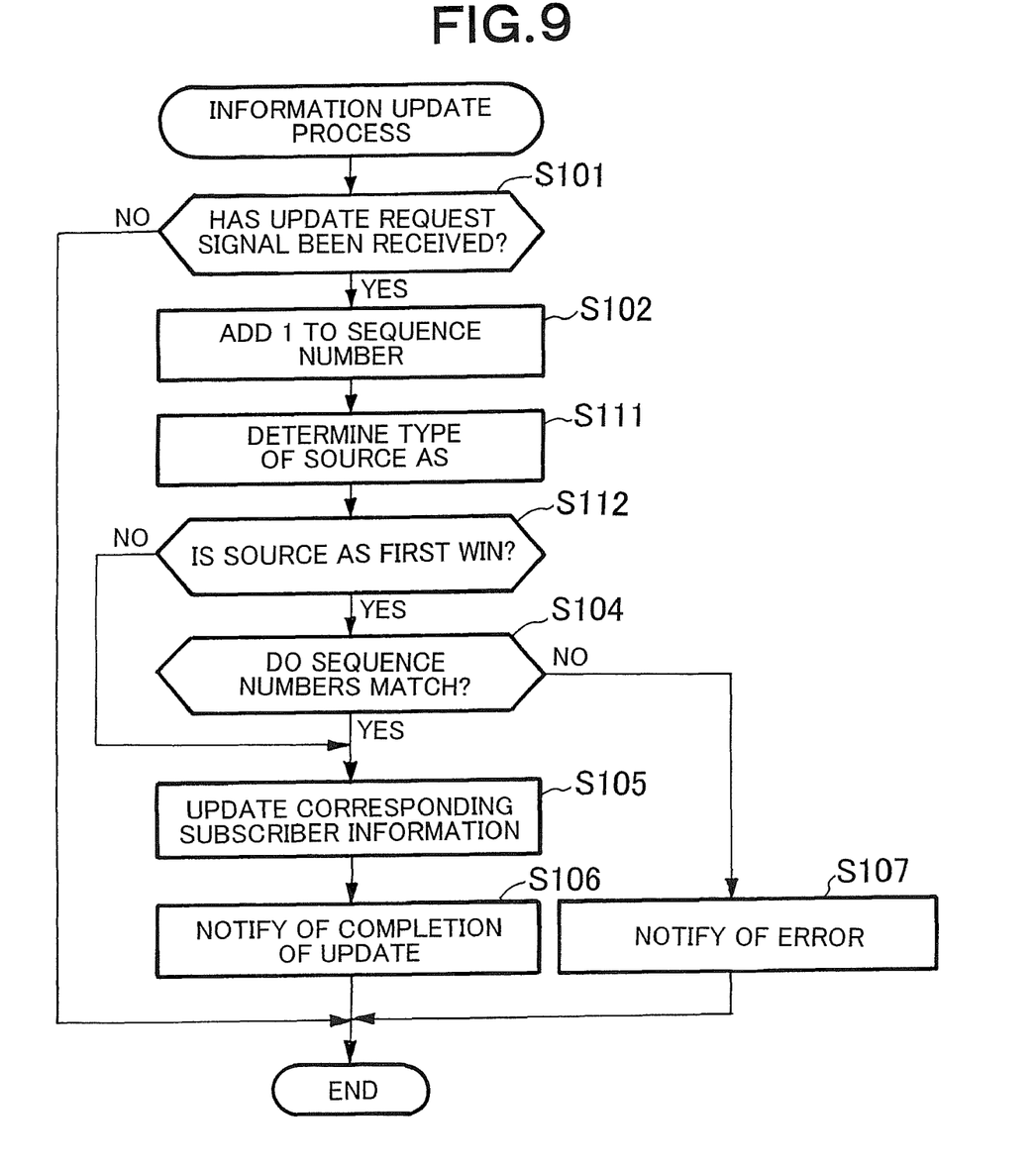
FIG. 9 is a flowchart for describing an operation in the modification of the embodiment of the present invention.

FIG. 9 is a flowchart for describing the operation of the CPU 41 of the HSS 40, according to the above-described modification. In the operation, the CPU 41 performs an information update process by an interrupt process of a predetermined cycle. Processes at steps S101 and S102 in the drawing are the same as those described above with reference to FIG. 7.

After the CPU 41 has added "1" to a sequence number, the CPU 41 determines a type of an AS 30 that has transmitted an update request signal in process (step S111). The type corresponds, for example, to an "application server" in the table 47 in FIG. 8. The CPU 41 refers to the table 47 in the storage apparatus 45 to determine whether an update method of the AS 30 which is a source is the first win scheme (step S112).

If the update method is the first win scheme ("Yes" at step S112), then the CPU 41 moves to a process at step S104 to update subscriber information 46 with the first win scheme. On the other hand, if the update method is not the first win scheme ("No" at step S112), then the CPU 41 moves to an process at step S105 to update subscriber information 46 with the last win scheme. Processes at subsequent steps S104 to S107 are the same as those described above with reference to FIG. 7 and thus description thereof is omitted.

By thus setting in advance an update method for the subscriber information 46 for each AS in the AS group 30, an identifier indicating an update method does not need to be described in an update request signal to be transmitted from an AS.

Note that when an update is performed using the last win scheme, a sequence number is not used upon updating subscriber information 46. Thus, an AS 30 that employs the last win scheme may stop the process of periodically acquiring a sequence number.

In the processes described with reference to FIGS. 7 and 9, the subscriber information 46 is updated using the first win scheme or the last win scheme based on an identifier added to an update request signal or a table (47) held by the HSS 40. Instead of this, an update scheme may be dynamically changed according to conditions of a load of communication. An exemplary operation of the CPU 41 of the HSS 40 for such a case is shown in a flowchart in FIG. 10.

Figure 10:
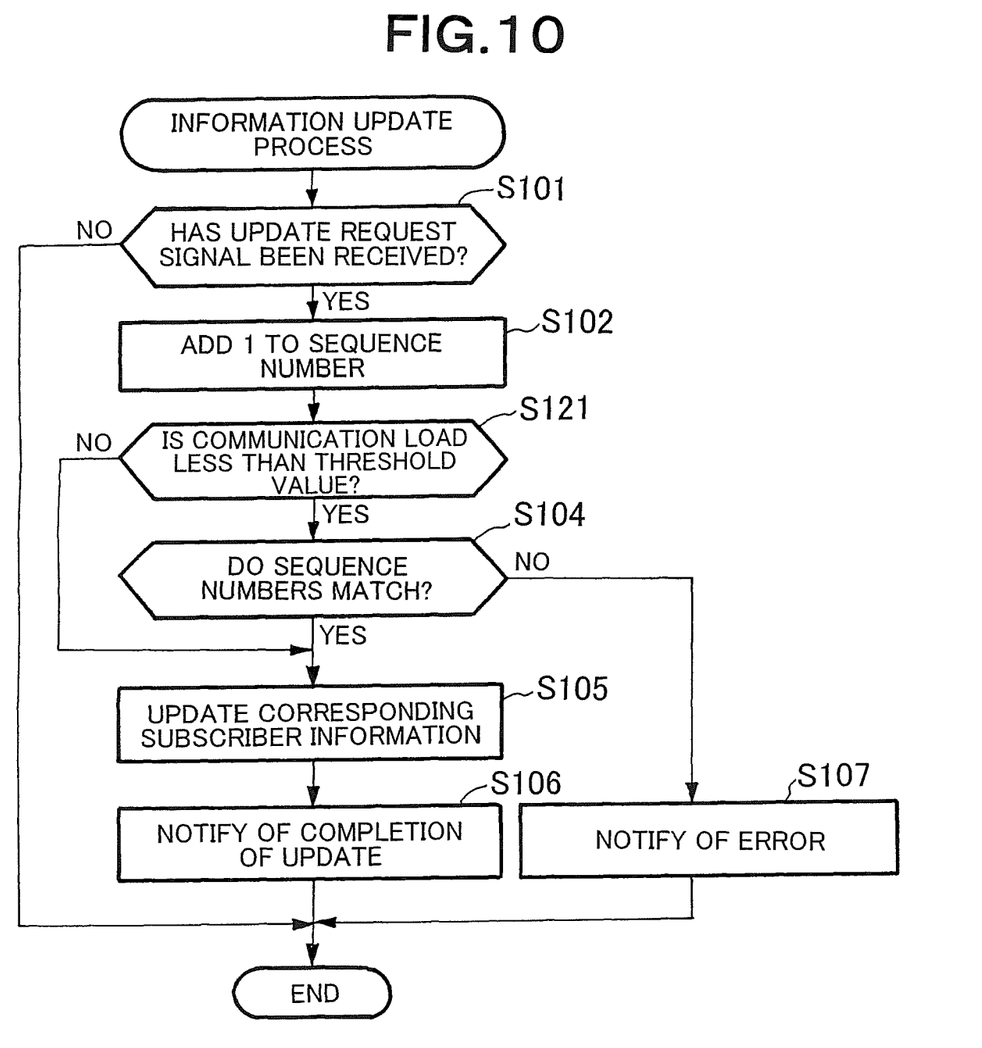
FIG. 10 is a flowchart for describing an operation in another embodiment of the present invention.

In FIG. 10, operations (steps S101 and S102) including receiving an update request signal from an AS 30 and updating a sequence number are the same as those described above (FIGS. 7 and 9). The CPU 41 detects a load of communication at the present time by the communication control unit 44 and determines whether a value of the load of communication is less than a predetermined threshold value (step S121).

If, as a result of the determination, the load of communication is less than the threshold value ("Yes" at step S121), then the CPU 41 moves to a sequence number comparison process to update subscriber information 46 with the first win scheme (step S104). If the load of communication at the present time is greater than the threshold value ("No" at step S121), then an update is performed with the last win scheme. That is, subscriber information 46 is updated without comparing sequence numbers (step S105). Subsequent steps are the same as those described above with reference to FIGS. 7 and 9 and thus description thereof is omitted.

According to this embodiment, in conditions where a load of communication at the present time is relatively low, the subscriber information 46 is updated with the first win scheme with which integrity is certainly maintained. On the other hand, in conditions where a load of communication is relatively high, in order to prevent further load from being applied to communication, the subscriber information 46 is updated with the last win scheme. Accordingly, the subscriber information 46 can be adaptively updated.

The present invention is not limited to the above-described embodiments and various modifications and applications are possible. It is also possible to arbitrarily combine the above-described embodiments and modification. Although in the above-described embodiments a first win and a last win are used as update schemes, the update schemes in the present invention are not limited thereto.

Although in the above-describe embodiments a chat service, a message service, and a presence service are exemplified as services to be provided by the AS group 30, the present invention is not limited thereto and any type of services may be employed.

The network configuration of an information update system (100) is not limited to that shown in FIG. 1. For example, the SIP servers in the SIP server group 20 may be divided into a plurality of server apparatuses having, for example, a function of controlling access from the subscriber terminal group 10, a gateway function with other networks, and a function of controlling a session. A target of data update is not limited to subscriber information (46) held by an HSS (40), as described in the above-described embodiments, and may be general data on a computer terminal. Data to be updated may be any data. An apparatus that requests for the update is not limited to an AS (30) and any apparatus can be used as long as the apparatus can transmit an update request signal.

In the above-described embodiments the description is made that a program for an information update process to be performed by the CPU 41 of the HSS 40 is stored in advance in the ROM 42. Instead of this, the program may be stored in a computer-readable recording medium such as a memory card, a CD-ROM (Compact Disc Read-Only Memory), a DVD (Digital Versatile Disk), or an MO (Magneto Optical disk), distributed, and installed on another computer to cause the computer to operate as the above-described means.

Furthermore, the above-described program may be stored in a disk apparatus or the like which is included in a server apparatus on the Internet, and superimposed on a carrier wave, for example, to download the program to a computer.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. An information update system comprising:
    a plurality of application server apparatuses to serve a subscriber with respective application services through a corresponding SIP (session initiation protocol) server; and
    a home subscriber server apparatus to store information regarding the subscriber and connected to the application server apparatus and to the SIP server, wherein
    each of the plurality of application server apparatuses comprises a transmitting unit to transmit an update request signal to the home subscriber server apparatus for requesting updating of the information regarding the subscriber, the update request signal including update contents, and
    the home subscriber server apparatus comprises:
        a selector configured to select, when receiving the update request signal, an updating method corresponding to said update request signal from a plurality of updating methods; and
        an updating unit to update the information regarding the subscriber in accordance with the update contents contained in the update request signal through the selected updating method, wherein
    each of the plurality of application server apparatuses adds an identifier for identifying an updating method to the update request signal to be transmitted to the home subscriber server apparatus, and
    the selector selects the updating method identified by the identifier added to the update request signal out of the plurality of updating methods, and further wherein
        the updating method is one of a first win scheme and a last win scheme, the information is updated based on an update request signal received first by the home subscriber server when the first win scheme is selected by the selector, and the information is updated based on an update request signal received last by the home subscriber server when the last win scheme is selected by the selector,
    wherein the plurality of updating methods include:
        a first updating method in which information is updated based on an update request signal received by the home subscriber server apparatus, if the update request signal has a same sequence number as a current sequence number which is currently stored in the home subscriber server apparatus and changed every time the home subscriber server apparatus updates information; and
        a second updating method in which information is updated based on every update request signal which is received by the home subscriber server apparatus.

2. The information update system according to claim 1, wherein the home subscriber server apparatus sends an error signal to the application server apparatus from which the update request signal is transmitted, when the selector selects the first updating method and the update request signal includes a different sequence number from the current sequence number currently held by the home subscriber server apparatus.

3. A non-transitory and tangible computer-readable data storage medium storing a program that, when executed by a processor of a computing device, causes a computer storing information functions of:
    serving a subscriber with respective application services, by a plurality of application server apparatuses, through a corresponding SIP (session initiation protocol);
    storing information regarding the subscriber, by a home server apparatus connected to the application server apparatus and to the SIP server;
    transmitting, by a transmitting unit within each server apparatus, an update request signal to the home subscriber server apparatus for requesting updating of the information regarding the subscriber, the update request signal including update contents;
    selecting, by a selector within the home subscriber server apparatus, an updating method from a plurality of updating methods when receiving the update request signal, the updating method corresponding to the update request signal;
    updating, by an updating unit within the home subscriber server apparatus, the information regarding the subscriber in accordance with the update contents contained in the update request signal through the selected updating method; and
    adding an identifier to the update request signal to be transmitted, by each application server apparatus, the identifier identifying an updating method, where the selector selects the updating method identified by the identifier, wherein
        the updating method is one of a first win scheme and a last win scheme, the information is updated based on an update request signal received first by the home subscriber server when the first win scheme is selected by the selector, and the information is updated based on an update request signal received last by the home subscriber server when the last win scheme is selected by the selector,
    wherein the plurality of updating methods include:
        a first updating method in which information is updated based on an update request signal received by the home subscriber server apparatus, if the update request signal has a same sequence number as a current sequence number which is currently stored in the home subscriber server apparatus and changed every time the home subscriber server apparatus updates information; and
        a second updating method in which information is updated based on every update request signal which is received by the home subscriber server apparatus.

4. The non-transitory and tangible computer-readable data storage medium according to claim 3, wherein the program further causes the computer a function of, when selecting the first updating method out of the plurality of updating methods, sending an error signal to the application server apparatus which has transmitted the update request signal having a different sequence number from the current sequence number currently held by the home subscriber server apparatus.

5. An information update method comprising:

serving a subscriber with respective application services, by a plurality of application server apparatuses, through a corresponding SIP (session initiation protocol) server;

storing information regarding the subscriber, by a home subscriber server apparatus connected to the application server apparatus and to the SIP server;

transmitting, by a transmitting unit within each application server apparatus, an update request signal to the home subscriber server apparatus for requesting updating of the information regarding the subscriber, the update request signal including update contents;

selecting, by a selector within the home subscriber server apparatus, an updating method from a plurality of updating methods when receiving the update request signal, the updating method corresponding to the update request signal;

updating, by an updating unit within the home subscriber server apparatus, the information regarding the subscriber in accordance with the update contents contained in the update request signal through the selected updating method; and adding an identifier to the update request signal to be transmitted, by each application server apparatus, the identifier identifying an updating method, where the selector selects the updating method identified by the identifier, wherein the updating method is one of a first win scheme and a last win scheme, the information is updated based on an update request signal received first by the home subscriber server when the first win scheme is selected by the selector, and the information is updated based on an update request signal received last by the home subscriber server when the last win scheme is selected by the selector, wherein the plurality of updating methods include:

a first updating method in which information is updated based on an update request signal received by the home subscriber server apparatus, if the update request signal has a same sequence number as a current sequence number which is currently stored in the home subscriber server apparatus and changed every time the home subscriber server apparatus updates information; and a second updating method in which information is updated based on every update request signal which is received by the home subscriber server apparatus.

6. The information update method according to claim 5, further comprising:

when selecting the first updating method out of the plurality of updating methods, sending an error signal to the application server apparatus which has transmitted the update request signal having a different sequence number from a current sequence number currently held by the home subscriber server apparatus.

\* \* \* \* \*